US006500237B2

(12) United States Patent
Winchester et al.

(10) Patent No.: US 6,500,237 B2
(45) Date of Patent: Dec. 31, 2002

(54) REMOVING HYDROGEN SULFIDE FROM A GASEOUS MIXTURE USING FERRIC IONS BONDED TO CALCINED DIATOMITE

(75) Inventors: Eric L. Winchester, Fredericton (CA); Michael J. McMullin, New Maryland (CA); Jeffrey K. Hum, Fredericton (CA)

(73) Assignee: ADI International Inc., Fredericton (CA)

( * ) Notice: Subject to any disclaimer, the term of this patent is extended or adjusted under 35 U.S.C. 154(b) by 65 days.

(21) Appl. No.: 09/777,840

(22) Filed: Feb. 7, 2001

(65) Prior Publication Data

US 2001/0005981 A1 Jul. 5, 2001

Related U.S. Application Data

(63) Continuation-in-part of application No. 09/407,708, filed on Sep. 28, 1999, now Pat. No. 6,200,482, which is a continuation-in-part of application No. 08/909,819, filed on Aug. 12, 1997, now abandoned.

(51) Int. Cl.$^7$ .............................................. B01D 53/02
(52) U.S. Cl. ............................. 95/117; 95/122; 95/136; 95/148; 423/231
(58) Field of Search .......................... 95/136, 148, 117, 95/121, 122; 423/231

(56) References Cited

U.S. PATENT DOCUMENTS

| 4,089,809 A | 5/1978 | Farrior, Jr. ................... 252/459 |
|---|---|---|
| 4,201,751 A | 5/1980 | Holter et al. ................ 423/210 |
| 4,246,243 A | 1/1981 | Fox ............................. 423/225 |
| 4,246,244 A | 1/1981 | Fox ............................. 423/225 |
| 4,324,298 A | 4/1982 | Fox ............................. 175/64 |
| 4,366,131 A | 12/1982 | Fox ............................. 423/231 |
| 4,374,106 A | 2/1983 | Tipton et al. ................ 423/231 |
| 5,234,884 A | 8/1993 | Mouri et al. ................ 502/405 |
| 5,281,445 A * | 1/1994 | Khare ......................... 427/445 |
| 5,320,992 A | 6/1994 | Fox et al. ..................... 502/84 |
| 5,478,541 A | 12/1995 | Samuels et al. ............ 423/220 |
| 5,632,931 A | 5/1997 | Fox et al. ............... 252/378 R |
| 5,780,001 A | 7/1998 | Khare et al. ................ 423/230 |
| 5,792,438 A | 8/1998 | Scranton, Jr. .......... 423/244.02 |
| 5,858,912 A | 1/1999 | Fox ............................. 502/439 |
| 6,126,911 A * | 10/2000 | Scranton ..................... 423/231 |

OTHER PUBLICATIONS

Proceedings of the 51$^{st}$ Industrial Waste Conference, May 6, 7, 8, 1996 Purdue University West Lafayette, Indiana Paper #24 Entitled:"Thiopaq© Bioscrubber: An Innovative Technology to Remove Hydrogen Sulfide from Air and Gaseoous Streams".
Proceedings, Weftec© '96 69$^{th}$ Annual Conference & Exposition Vol. 2, Part I: Residuals and Biosolids Management Part II: Collection Systems pp. 1–10:Digester Gas Treatment Using Water Only Solves H$_2$S Problems at the Tulare Water Control Facility Tulare, CA.

* cited by examiner

*Primary Examiner*—Ivars Cintins
(74) *Attorney, Agent, or Firm*—Mario Theriault

(57) ABSTRACT

A process for removing hydrogen sulfide from a gas stream wherein the filtering media consists essentially of calcined diatomite and between 5% and 30% by weight of ferric ions bonded to the calcined diatomite. This process is particularly efficient due to the fact that the removal of hydrogen sulfide from the gas stream is effected with a single pass adsorption performance of up to 45 mg of H$_2$S per gram of filtering media. Other advantages include the fact that the process has the ability to remove H$_2$S form a gaseous mixture, from a concentration of 30,000 ppm down to non-detectable levels in a single pass. Repeated in-situ regeneration of the filtering media has been proven to be a simple matter of blowing ambient air through the filtering media.

21 Claims, No Drawings

REMOVING HYDROGEN SULFIDE FROM A GASEOUS MIXTURE USING FERRIC IONS BONDED TO CALCINED DIATOMITE

This is a continuation-in-part of U.S. patent application Ser. No. 09/407,708 filed on Sep. 28, 1999, now U.S. Pat. No. 6,200,482 which was a continuation-in-part of U.S. patent application Ser. No. 08/909,819, filed on Aug. 12, 1997, now abandoned.

FIELD OF THE INVENTION

The present invention relates to the removal of hydrogen sulfide ($H_2S$) from various gases, and more particularly it relates to the removal of hydrogen sulfide from a gaseous mixture using a filtering media containing iron hydroxide intimately bonded to calcined diatomite.

BACKGROUND OF THE INVENTION

Hydrogen sulfide can be present in various air streams and is often found in gas streams associated with petroleum storage and transfer facilities, anaerobic digesters, sewage treatment plants and pulp and paper mills. In many cases, the hydrogen sulfide has to be removed because of its toxicity, corrosive properties, and unpleasant odour.

Several methods are known and have been used in the past for removing hydrogen sulfide from a gas stream. Perhaps the most popular method is one which consists in passing the gaseous mixture through an iron sponge bed. The iron sponge bed is a type of filter which comprises essentially iron salts adsorbed on a wood chip support media. Also, there are known processes in which a sulfurous gas is passed through a bed of iron oxide particles. These processes and various others are described in US Patents which can be found in particular in the US Classification 423/231 entitled: Removing Hydrogen Sulfide from a Gaseous Mixture Utilizing Iron Oxide or Hydroxide.

Problems associated with the prior art processes are numerous and include the facts that some media are self igniting when exposed to air and therefore are not renewable. Because of their weak sulfur retention, some of these non-renewable media must be treated as hazardous waste. Other known filtering media have a relatively low $H_2S$ adsorption capacity or a low $H_2S$ adsorption performance in a single pass process. Another drawback of some commercial $H_2S$ filtering systems is that the filtering media must be disposed of after a single use.

As such, it will be appreciated that there continues to be a need for a filtering process in which the filtering media is capable of removing hydrogen sulfide from a gaseous mixture with a high single pass performance. Further, it is believed that there continues to be a need for a filtering process wherein the filtering media is easily renewable and does not generate any hazardous waste when disposed of after multiple reuses.

SUMMARY OF THE INVENTION

The present invention provides for an effective process for removing hydrogen sulfide from a gas stream. Essentially, the process according to the present invention uses a filtering media which has a large single-pass adsorption performance, which is renewable several times and which has a considerable lifetime adsorption capacity.

In a first aspect of the present invention, there is provided a process for removing hydrogen sulfide from a gas stream wherein the gas stream is passed through a filtering media consisting essentially of calcined diatomite and between 5% and 30% by weight of ferric ions bonded to the calcined diatomite.

This process is particularly efficient due to the fact that the removal of hydrogen sulfide from the gas stream is effected with a single pass adsorption performance of up to 45 mg of $H_2S$ per gram of filtering media. Other advantages include the fact that the process has the ability to remove $H_2S$ from a gaseous mixture, from a concentration of 30,000 ppm down to non-detectable levels of less than 0.2 ppm in a single pass. Further, the lifetime adsorption capacity of the filtering media is about one half or more of the weight of the filtering media.

In another aspect of the present invention, there is provided a process for removing hydrogen sulfide from a gas stream, comprising the steps of passing the gas stream through a filtering media consisting essentially of calcined diatomite, and between 5% and 30% by weight of ferric ions bonded by chemisorption bonds to the calcined diatomite. The process further includes the steps of renewing the filtering media several times when the filtering media is saturated with sulfides by blowing ambient air through the filtering media. The regeneration of the filtering media can be accomplished while maintaining an average hydrogen sulfide adsorption performance thereof of about 32 mg of hydrogen sulfide per gram of filtering media per cycle. Because the filtering media is non-flammable, there is no risk of combustion due to the heat generated during the regeneration process.

In yet another aspect of the present invention, there is provided a process for removing hydrogen sulfide from a gas stream, comprising the step of passing the gas stream through a filtering media consisting essentially of calcined diatomite having particles ranging in sizes between about 30 mesh and about 60 mesh, and between 5% and 30% by weight of ferric ions bonded by chemisorption bonds to the calcined diatomite. The process is particularly advantageous for filtering moist gases, due to the fact that the filtering media remains porous when wet. The efficiency of the process increases with the adsorption of a certain amount of moisture in the filtering media.

Still another feature of the process according to the present invention is that it is susceptible of a low cost of material, installation and operation, and accordingly is then susceptible of low price of sale to the industry, thereby making such $H_2S$ filtering process economically available to the public.

Other advantages and novel features of the invention will become apparent from the following detailed description.

DETAILED DESCRIPTION OF THE PREFERRED EMBODIMENT

While this invention is susceptible of embodiments in many various forms, there will be described in details herein a specific embodiment, with the understanding that the present disclosure is to be considered as an example of the principles of the invention and is not intended to limit the invention to the embodiment described.

The filtering media used in the process according to preferred embodiment was the subject of an earlier patent application, Ser. No. 09/407,708, filed in Sep. 28, 1999, in which it is described as a filtering media for removing arsenic from ground water. The filtering media is known under the trademark MEDIA G2® and is available from ADI International Inc., a corporation having its principal place of business in Fredericton, New Brunswick, Canada. Although the initial purpose of the filtering media was for use as a water filter, it was discovered that the same filtering media has advantageous properties in removing hydrogen sulfide from a gas stream.

The filtering media contains iron hydroxide $Fe(OH)_3$ intimately bonded to calcined diatomite. The ferric ions content in the filtering media is between about 5% and about 30% by weight. The preferred calcined diatomite material has particles ranging in sizes from about 30 mesh to about 60 mesh. This size and type of diatomite particles has been found to be advantageous for use in filtering arsenic from water as well as for use in gas filtering columns, particularly for allowing intimate contact between the gas and the ferric ions bonded to the diatomite particles. The calcined diatomite particles do not offer substantial resistance to the flow of a gas passing through it and do not expand in contact with a moist gas.

The calcined type of diatomite is believed to be an important element also contributing to the performance of filtering media in removing hydrogen sulfide from sulfurous gases. Calcined diatomite particles have multiform shapes and a greater porosity than ordinary diatomite particles. The heat treatment applied to the diatomite particles during the calcination process, increases the porosity of the particles by breaking their surfaces and forming pores, cracks, crevices, cavities, hollows and protrusions. These pores, cracks, crevices, cavities, hollows and protrusions offer additional surfaces on each particle to adsorb and to retain ferric ions.

During the manufacturing of the filtering media, the calcined diatomite is impregnated with ferric ions in a liquid form, such as a ferric chloride solution. The solution entrains the ferric ions over the entire surface of the calcined diatomite particles and deep inside the pores, cracks, crevices and cavities, of the particles. Then, the ferric chloride is converted into iron hydroxide in-situ within the diatomite particles, using sodium hydroxide for example, to better bond the ferric ions over and into the entire structure of each diatomite particle. The diatomite material has negative charges and attracts the positively charged ferric ions, thereby contributing to the formation of strong ionic impregnation bonds between the diatomite material and the ferric ions.

During the manufacturing process, the sodium hydroxide is added slowly to bring the pH of the slurry to a final value of at least about 9, ensuring a complete and unhasty conversion of the ferric chloride to iron hydroxide. This manufacturing process is advantageous for yielding a ferric ion content, in the form of iron hydroxide, of between about 5% and about 30% by weight of the media. During this manufacturing process, it is believed that irregular clusters of ferric ions are formed and become entrapped or otherwise interlocked inside the pores, cracks, crevices and cavities of the calcined diatomite particles, and therefore become strongly bonded to the calcined diatomite particles. The bond described above is believed to be a chemisorption bond produced by an impregnation-oxidation process which is characterized by its irreversible chemical forces. It is also believed that these chemisorption bonds between the ferric ions and the calcined diatomite particles contribute greatly to the abilities of the filtering media to retain its ferric ions such that it is renewable several times after being saturated with sulfides. Also it was found that when the filtering media is saturated with water or subjected to a flow of water through it, the iron component is not released from the filtering media. This finding supports the fact that iron hydroxide is intimately bonded to the calcined diatomite particles.

Other advantages of using the filtering media for removing $H_2S$ from a gas stream include the fact that it has a pH of about 10–11, which favourably affect the reaction of $H_2S$ with the ferric ions in the filtering media.

Testing of the filtering media was carried out to determine its optimum performance in removing hydrogen sulfide from a sulphurous gas. In a first series of tests to determine adsorption capacities, comparative results were obtained from similar tests carried on a variant of the filtering media, hereinafter referred to as the variant media, wherein the calcined diatomite was replaced by vermiculite. The filtering media and the variant media are generally or jointly referred to as the media sample or both media samples.

Both media samples were subjected to testing in dry and moist conditions. Dry columns were filled with media samples that were not rinsed or pre-moistened. All the fines were present in the media samples. Moist columns were prepared in three different ways: 1) washing the media samples with water until all the fines were removed; 2) soaking the media samples in water overnight and placing them in the columns with minimal removals of the fines, and 3) placing the media samples into the columns and then pouring water down through them. In all three cases, the moist columns were allowed to drain out all excess water for at least one day before testing began.

All columns were fed a gas stream from an anaerobic digester, containing approximately 30,000 ppm of $H_2S$. The outlet $H_2S$ concentration was measured several times per day, using gas testing tubes known under the trade name DRAEGER™, and having a minimum readable value of 0.2 ppm. Saturation of the media samples was determined when $H_2S$ concentration in the treated gas exceeded 500 ppm.

The results of the tests were as follows. The adsorption performance of the column containing the washed filtering media according to the preferred embodiment was approximately 30 mg of $H_2S$ per gram of filtering media before it was considered saturated. The filtering media which had been soaked but not rinsed of fines had an adsorption performance of 45 mg of $H_2S$ per gram of filtering media. The dry filtering media adsorbed about 40 mg of $H_2S$ per gram of filtering media. The variant media was able to adsorb almost 70 mg of $H_2S$ per gram of variant media.

It is believed that during the filtration process, the media samples adsorb $H_2S$ and form ferric sulfide by the oxidation of $H_2S$ and the dissociation of the iron hydroxide species present in the media samples.

Regeneration of the filtering media was accomplished by the oxidation of the FeS produced during $H_2S$ removal. FeS was oxidized by simply blowing ambient air through the column to form different species of iron hydroxide, elemental sulphur and water. The regeneration process reconverts the iron hydroxide to its original bond to the diatomite material such that the filtering media is usable again to remove $H_2S$ from a sulfurous gas stream.

Ferric sulfide is grey to brownish black in colour and agglomerates into lumps, rods or granular powder during the filtration process. As a sulfurous gas is passed upward through the filtering media, the filtering media gradually turns black, beginning at the bottom of the column, and indicates that $H_2S$ removal is taking place. During the process, the formation of lumps and fine clay-like gray powder can also be noticed.

Some of the test columns were transparent. During regeneration of the filtering media, a colour change was also noted. The filtering media was seen to change from completely black to almost its original orange colour. After regeneration, the filtering media may have a lighter shade of orange, possibly due to the elemental sulphur, being yellow, produced in the filtering media. In some cases, black specs may remain in the filtering media. These black specs indicate that total regeneration has not been attained.

Attempts to regenerate the variant media were unsuccessful. Blowing air through the column did not return the variant media to its original colour. Also, it was found that as this variant media becomes wet, it expands to such a degree that the filter column becomes completely plugged, and the flow of gas there through becomes almost impossible.

The testing of the filtering media has indicated that the adsorption performance of the dry filtering media was similar to that of the pre-moistened filtering media, being 40 mg of $H_2S$ and 45 mg of $H_2S$ per gram of filtering media respectively. The performance of the dry filtering media has been shown to increase to a same level as for the moist filtering media, after it had adsorbed moisture from the gas stream passing through it. It is believed that the slight difference in initial performance is compensated for by the advantages in eliminating the need for pre-moistening the filtering media.

The testing of the filtering media and the variant media also indicated that although the variant media had the ability to absorb more $H_2S$ in a first run, it is not renewable and therefore, the adsorption capacity of the filtering media according to the preferred embodiment exceeds that of the variant media in only two cycles. One cycle is referred to as a saturation of the filtering media with sulfides and the regeneration of the filtering media.

A second part of the testing program was focussed on the mechanical characteristics of the filtering process, and more particularly it was focussed on finding an optimum empty bed contact time (EBCT). The EBCT is defined as the residence time of the gas inside the filtering column.

Three different columns of one half inch in diameter and five feet tall each were set up to test the effect of EBCT. These three columns were set up to run at 40, 130 and 200 ml/min, yielding EBCT of 300, 90 and 60 seconds, respectively. Again, all columns were fed a gas stream from an anaerobic digester, containing approximately 30,000 ppm of $H_2S$. The filtering media in all three columns were pre-moistened.

The results indicate that the EBCT of 60 and 90 seconds worked better than the 300 second column. The 60 second column adsorbed 45 mg of $H_2S$ per gram of filtering media during its first cycle, gradually declining to an average 32 mg of $H_2S$ per gram of filtering media per cycle and a total removal of 560 mg of $H_2S$ per gram of filtering media in 18 cycles. Testing on the 60 second EBCT column was stopped when the removal was only 26 mg of $H_2S$ per gram of filtering media for the last two cycles. Average outlet $H_2S$ concentration prior to saturation was about 30 ppm, with several readings as low as 0.2 ppm.

The 90 second EBCT had similar results, averaging 30 mg of $H_2S$ removed per gram of filtering media, and a total removal of 326 mg of $H_2S$ per gram of filtering media in 11 cycles. Although this column did not remove as much $H_2S$ per cycle, it has achieved a lower effluent concentration of $H_2S$, averaging 23 ppm.

The 300 second EBCT column did not work as well as the other two columns. Its adsorption performance was only 20 mg/g per cycle, and it removed 115 mg/g in 6 cycles. Average outlet $H_2S$ concentration was 40 ppm.

Further testing was carried out to measure the effectiveness of the filtering media in removing $H_2S$ at different linear velocities. Linear velocity is the speed at which the gas flows vertically through the filtering column. Two columns were set up to operate at 1 ft/min and 3 ft/min respectively, with a common EBCT of 60 seconds. The results shown below are compared to the 60 second EBCT column mentioned before, which was operating at 5 ft/min.

The 3 ft/min column yielded an average removal rate of 18 mg/g per cycle. The filtering column was tested through 6 cycles and adsorbed 110 mg/g in total. The 1 ft/min column averaged only 17 mg/g per cycle. The column was tested through 6 cycles, and removed 100 mg/g in total. The results show that the 1 ft/min and the 3 ft/min velocities are not as effective as the 5 ft/min test which gave an average 32 mg of $H_2S$ removal per gram of filtering media per cycle, and a total lifetime removal capacity of 560 mg of $H_2S$ per gram of filtering media, in 18 cycles.

In view of these results, a new column, 10 feet in length was built to find the maximum linear velocity which the filtering media can handle. This column was set up to run at 60 second EBCT with a linear velocity of 10 ft/min, through a filtering media in a dry state. During three cycles, the average adsorption performance was 32 mg of $H_2S$ per gram of filtering media. It was observed, however, that during the first cycle, the outlet $H_2S$ concentration never went below 50 ppm. During the second and third cycles, it was much lower, averaging less than 5 ppm prior to saturation. This may be explained by the higher flow rate and therefore by a longer time required for wetting the filtering media. However, once properly wetted, performance was found to be excellent.

In commercial and industrial applications it is recommended to contain the filtering media in a filtering column having a window or sight glass, such that users can develop certain visual skills for evaluating at a glance, the conditions of the filtering media. During the regeneration of the filtering media, it is recommended to pass the purging air exiting one filtering column into another filtering column to capture any hydrogen sulfide that may be released from the filtering column being regenerated. During regeneration of the filtering media, a small amount of the sulphur on the ferric sulfide may be reconverted to hydrogen sulfide gas and stripped off the filtering media by the regeneration air. The amount of hydrogen sulfide exiting the filter in the regeneration air is less than 0.02% of the hydrogen sulfide which was originally adsorbed by the filtering media. For environmental reasons, it is therefore recommended to pass the purging air exiting a filtering column being regenerated into a second filtering column before releasing the purging air into the atmosphere. For convenience, this second filtering column may be an adjacent filtering column in a bank of filtering columns or a secondary filtering column provided for this purpose.

It will be appreciated that where the application can tolerate the injection of ambient air in the gas stream, the regeneration of the filtering media can be effected automatically on a continuing basis. It is also believed that the filtering media can be made new again by separating the sulphur particles from it, by washing, sifting or otherwise.

As to additional details related to the manufacturing, installation and use of the filtering media, the same should be apparent from the above description, and accordingly further discussion relative to the manner of making, using and renewing the filtering media would be considered redundant and is not provided.

While one embodiment of the present invention has been described herein above, it will be appreciated by those skilled in the art that various modifications, alternate compositions, alternate methods and equivalents may be employed without departing from the true spirit and scope of the invention. Therefore, the above description should not be construed as limiting the scope of the invention which is defined by the appended claims.

We claim:

1. A process for removing hydrogen sulfide from a gas stream, comprising the step of passing said gas stream through a filtering media consisting essentially of calcined diatomite and between 5% and 30% by weight of ferric ions bonded to said calcined diatomite.

2. The process as claimed in claim 1, wherein said step of passing said gas stream through said filtering media is effected at a velocity of 5 ft/min.

3. The process as claimed in claim 2 wherein said step of passing said gas stream through said filtering media is effected at a retention time of said gas stream through said filtering media of about 60 seconds.

4. The process as claimed in claim 2, further comprising the step of increasing a moisture content of said filtering media while maintaining said velocity.

5. The process as claimed in claim 1, wherein said step of passing said gas stream through said filtering media further comprises the step of reducing a hydrogen sulfide content in said gas stream from 30,000 ppm to a non-detectable level.

6. The process as claimed in claim 1, wherein said step of passing said gas stream through said filtering media further comprises the steps of passing said gas stream once through said filtering media and simultaneously adsorbing 45 mg of hydrogen sulfide from said gas stream for each gram of said filtering media.

7. The process as claimed in claim 1, further comprising the step of renewing said filtering media when said filtering media is saturated with sulfides by blowing ambient air through said filtering media.

8. The process as claimed in claim 7, farther comprising the step of repeating said steps of passing said gas stream through said filtering media and of renewing said filtering media, while maintaining an average hydrogen sulfide adsorption performance of said filtering media of 32 mg of hydrogen sulfide per gram of said filtering media.

9. The process as claimed in claim 8, wherein said steps of passing said gas stream through said filtering media and of renewing said filtering media are repeated 18 times while maintaining an average hydrogen sulfide adsorption performance of said filtering media of 32 mg of hydrogen sulfide per gram of said filtering media.

10. The process as claimed in claim 7, further comprising the step of enclosing said filtering media in a filtering column having a sight glass.

11. The process as claimed in claim 10, further comprising the step of visually monitoring a color change in said filtering media.

12. The process as claimed in claim 7, further comprising the steps of enclosing said filtering media in a filtering column, and carrying said step of renewing said filtering media in-situ within said filtering column.

13. The process as claimed in claim 1 further comprising the step of injecting air in said gas stream.

14. The process as claimed in claim 1 further comprising the step of causing said filtering media to have a pH of about 10.

15. A process for removing hydrogen sulfide from a gas stream, comprising the steps of;
passing said gas stream through a filtering media consisting essentially of;
calcined diatomite, and
between 5% and 30% by weight of ferric ions bonded by chemisorption bonds to said calcined diatomite, and
renewing said filtering media when said filtering media is saturated with sulfides by blowing air through said filtering media;
repeating said steps of passing said gas stream through said filtering media and of renewing said filtering media, while maintaining an average hydrogen sulfide adsorption performance of said filtering media of 32 mg of hydrogen sulfide per gram of said filtering media.

16. The process as claimed in claim 15, wherein said steps of passing said gas stream through said filtering media and of renewing said filtering media are repeated several times while maintaining an average hydrogen sulfide adsorption performance of said filtering media of 32 mg of hydrogen sulfide per gram of said filtering media.

17. The process as claimed in claim 15, wherein said steps of passing said gas stream through said filtering media and of renewing said filtering media are repeated 18 times while maintaining an average hydrogen sulfide adsorption performance of said filtering media of 32 mg of hydrogen sulfide per gram of said filtering media.

18. A process for removing hydrogen sulfide from a gas stream, comprising the step of passing said gas stream through a filtering media consisting essentially of calcined diatomite having particles ranging in sizes between about 30 mesh and about 60 mesh, and between 5% and 30% by weight of ferric ions bonded thereto by chemisorption bonds.

19. The process as claimed in claim 18, wherein said gas stream is moist, and said step of passing said gas stream through a filtering media comprises the steps of simultaneously adsorbing moisture from said gas stream in said filtering media and maintaining particle sizes in said filtering media between about 30 mesh and 60 mesh.

20. The process as claimed in claim 18, further comprising the steps of regenerating said filtering media by passing ambient air through said filtering media, and repeating said steps of passing said gas stream through said filtering media and regenerating said filtering media until a cumulative hydrogen sulfide removal capacity of said filtering media has reached about one half the weight of said filtering media, while maintaining a single-pass hydrogen sulfide removal performance of said filtering media of 32 mg per gram of said filtering media.

21. A process for removing hydrogen sulfide from an anaerobic process gas stream, comprising the step of passing said gas stream through a filtering media consisting essentially of calcined diatomite and between 5% and 30% by weight of ferric ions bonded to said calcined diatomite.

* * * * *